United States Patent [19]

Bruno

[11] Patent Number: 5,207,092

[45] Date of Patent: May 4, 1993

[54] APPARATUS FOR SPIN CHECKING CLUTCH DRIVEN DISC ASSEMBLIES

[75] Inventor: Frank L. Bruno, Colorado Springs, Colo.

[73] Assignee: Dana Corporation, Toledo, Ohio

[21] Appl. No.: 683,280

[22] Filed: Apr. 10, 1991

[51] Int. Cl.⁵ .............................................. G01M 13/02
[52] U.S. Cl. ................................................... 73/118.1
[58] Field of Search ............................. 73/118.1, 865.9

[56] References Cited

U.S. PATENT DOCUMENTS

| | | |
|---|---|---|
| 2,044,067 | 6/1936 | Eldridge et al. . |
| 2,044,818 | 6/1936 | Spase . |
| 2,401,907 | 6/1946 | Cahill et al. . |
| 3,383,908 | 5/1968 | Amrhein et al. . |
| 3,473,373 | 10/1969 | Ashby . |
| 3,654,805 | 4/1972 | Ashby . |
| 3,910,107 | 10/1975 | Fabry ................................. 73/118.1 |
| 3,913,395 | 10/1975 | Brooks . |
| 4,615,212 | 10/1986 | Kugler et al. . |
| 4,683,746 | 8/1987 | Cullingford et al. . |

Primary Examiner—Robert Raevis
Attorney, Agent, or Firm—MacMillan, Sobanski & Todd

[57] ABSTRACT

An apparatus for automatically spin checking a driven disc assembly for warpage includes a stationary ring and a movable ring. A torque motor is provided with an output shaft connected to a splined hub, upon which the driven disc assembly is mounted for rotation between the two rings. A servo motor and ball srew mechanism selectively moves the movable ring toward the stationary ring so as to frictionally engage the driven disc assembly therebetween. When so engaged, the distance separating the two rings is measured by an electronic sensor. The torque motor is then energized to exert a predetermined torque on the driven disc assembly, attempting to rotate it against the frictional force generated by the rings. Next, the movable ring is gradually moved away from the stationary ring so as to gradually reduce the frictional force exerted on the driven disc assembly. When the frictional force has decreased a sufficient amount, the driven disc assembly will begin to rotate under the urging of the torque motor. Sensors are provided for sensing this rotation and for measuring the distance separating the two rings at that time. The difference between these two distances is compared with a standard value to determine if the driven disc assembly is excessively warped.

16 Claims, 5 Drawing Sheets

APPARATUS FOR SPIN CHECKING CLUTCH DRIVEN DISC ASSEMBLIES

BACKGROUND OF THE INVENTION

This invention relates in general to gauging fixtures and in particular to an apparatus for automatically spin checking driven disc assemblies adapted for use in friction clutches.

Clutches are well known devices which are frequently employed in vehicles to selectively connect a source of rotational power, such as the crankshaft of an engine, to a driven mechanism, such as a transmission. Typically, a cover of the clutch is connected to a flywheel carried on the end of the engine crankshaft for rotation therewith. Between the flywheel and the clutch cover, a pressure plate is disposed. The pressure plate is connected for rotation with the flywheel and the cover, but is permitted to move axially relative thereto. A shift lever assembly is provided for selectively moving the pressure plate back and forth in the axial direction. The shift lever assembly is usually operated by a driver of the vehicle by means of a foot actuated pedal.

A driven disc assembly is disposed within the clutch between the pressure plate and the flywheel. The driven disc assembly is carried on an output shaft of the clutch, which forms the input to the transmission. The driven disc assembly includes a hub, which is splined onto the output shaft, and a support plate which is mounted on the hub for limited rotational movement. A plurality of friction elements are usually secured to the outer ends of the support plate. Springs or similar torsion dampening devices may be provided between the support plate and the hub. When the pressure plate is moved toward the flywheel, the friction elements of the support plate are frictionally engaged therebetween so as to cause the output shaft of the clutch to rotate with the flywheel, the cover, and the pressure plate. When the pressure plate is moved away from the flywheel, the driven disc assembly is released from such frictional engagement so as to disconnect this driving connection.

The length of travel of the pressure plate between the engaged and disengaged positions is typically rather small, typically from 0.050 inch to 0.100 of an inch. Accordingly, the driven disc assembly (which is selectively engaged and disengaged by the pressure plate) must be manufactured to have a thickness which is within closely maintained tolerances. Furthermore, the driven disc assembly must not be excessively warped or otherwise non-planar in shape. Otherwise, the pressure plate may undesirably contact the driven disc assembly when moved to the disengaged position.

In the past, a test fixture has been provided for measuring the amount of warpage of a driven disc assembly, referred to as spin checking the assembly. This prior test fixture included a splined hub, upon which the driven disc assembly to be tested was mounted, disposed between a stationary ring and a movable ring. After the driven disc was installed, a pneumatic cylinder was actuated to move the movable ring toward the stationary ring such that the driven disc assembly was frictionally engaged therebetween. This movement initially positioned the two rings apart from one another by a distance which was equal to the thickness of the driven disc assembly. Then, the movable ring was retracted a predetermined distance from this initial position using a mechanical shim. This predetermined additional distance represented the maximum amount of warpage which could be tolerated for the particular driven disc assembly. Next, a predetermined amount of torque was applied to the hub to rotate the driven disc assembly relative to the rings. This torque was generated by means of a weight supported at the end of a pendulum connected to the hub. If the driven disc assembly was able to rotate under the urging of this applied torque, then the amount of warpage was within acceptable tolerances. However, if the driven disc assembly was not able to rotate under the urging of this applied torque, then the warpage of the driven disc assembly was beyond acceptable tolerances.

Although this prior test fixture has been found to function satisfactorily, it will be appreciated that it was somewhat slow and, therefore, inefficient in the production environment. Furthermore, it required several manual operations to be performed by an operator. Lastly, other than the inability of the driven disc assembly to rotate under the urging of the applied torque, the fixture generated no external indication of whether the tested assembly was good or bad. Thus, it would be desirable to provide an improved spin checking apparatus which automatically determines whether the driven disc assembly is good or bad and which generates an external indication to the operator of the test results.

SUMMARY OF THE INVENTION

This invention relates to an improved apparatus for automatically spin checking a driven disc assembly. The apparatus includes an enclosure having a stationary ring mounted thereon and a movable ring slidably supported thereon. A torque motor is provided with an output shaft connected to a splined hub, upon which the driven disc assembly is mounted for rotation between the two rings. Means are provided for selectively moving the movable ring toward the stationary ring so as to frictionally engage the driven disc assembly therebetween. When so engaged, the distance separating the two rings is measured by an electronic sensor. The torque motor is then energized to exert a predetermined torque on the driven disc assembly, attempting to rotate it against the frictional force generated by the rings. Next, the movable ring is gradually moved away from the stationary ring so as to gradually reduce the frictional force exerted on the driven disc assembly. When the frictional force has decreased a sufficient amount, the driven disc assembly will begin to rotate under the urging of the torque motor. Means are provided for sensing this rotation and for measuring the distance separating the two rings at that time. The difference between these two distances is compared with a standard value to determine if the driven disc assembly is excessively warped.

It is an object of this invention to provide an improved apparatus for spin checking a driven disc assembly.

It is another object of this invention to provide such a spin checking apparatus which operates automatically without manual involvement by an operator.

It is a further object of this invention to provide such a spin checking machine which generates an external indication to the operator of whether the driven disc assembly is good or bad.

Other objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
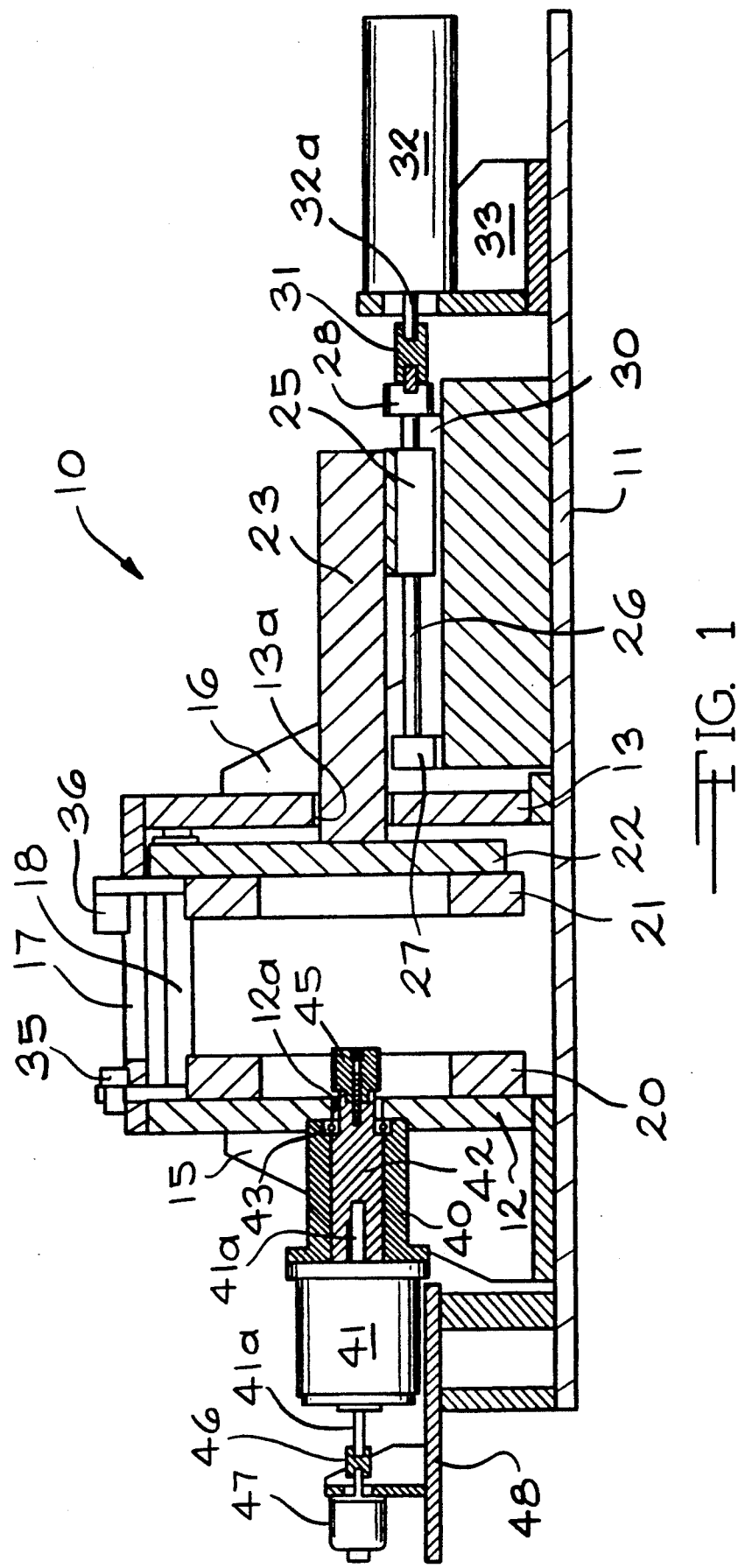
FIG. 1 is a side elevational view, partially in cross section, of an automatic spin checking apparatus in accordance with this invention, the apparatus being shown in an opened position.

Referring now to the drawings, there is illustrated in FIG. 1 an automatic spin checking apparatus, indicated generally at 10, in accordance with this invention. The apparatus 10 includes a base 11 having a rigid test enclosure secured thereto. The test enclosure includes an upstanding left end plate 12 and an upstanding right end plate 13. The end plates 12 and 13 are rigidly secured to the base 11 by respective left and right pairs of end plate brackets 15 and 16 (only one of each of the end plate bracket pairs 15 and 16 is illustrated). A top plate 17 is connected between the upper ends of the end plates 12 and 13. Also, a plurality of cylindrical shafts 18 (only one is illustrated) is connected between the end plates 12 and 13. The base 11, the end plates 12 and 13, the end plate brackets 15 and 16, and the top plate 17 form the rigid test enclosure for the apparatus 10. The function of the shafts 18 will be explained below.

A pair of rings 20 and 21 are provided within the test enclosure. The left ring 20 is secured to the left end plate 12 and, therefore, is immobile. The right ring 21 is secured to a support plate 22. The support plate 22 has a plurality of apertures (not shown) formed therethrough for receiving the shafts 18. Thus, the support plate 22 (and the right ring 21 secured thereon) is journalled for sliding movement on the shafts 18 toward and away from the left end plate 12 (and the left ring 20 secured thereto).

The support plate 22 is connected to a transfer bar 23 which extends through an opening 13a formed through the right end plate 13. The transfer bar 23 is connected to a nut 25 carried on a precision ball screw shaft 26. The ends of the ball screw shaft 26 are rotatably supported in left and right bearings 27 and 28. The bearings 27 and 28 are supported on a bearing bracket assembly 30 secured to the base 11. The right end of the ball screw shaft 26 extends through the right bearing 28 into engagement with a coupling 31. The coupling 31 is connected to the output shaft 32a of a bi-directional servo motor 32. The servo motor 32 is supported on a motor bracket assembly 33 connected to the base 11.

The servo motor 32 is conventional in the art and is adapted to be energized to rotate the output shaft 32a (and the ball screw shaft 26 connected thereto) in either of two rotational directions. When the ball screw shaft 26 is rotated in a first rotational direction, the nut 25 is moved toward the right. As a result, the transfer bar 23, the support plate 22, and the right ring 21 are all moved toward the right as a unit. Similarly, when the ball screw shaft 26 is rotated in a second rotational direction, the nut 25, the transfer bar 23, the support plate 22, and the right ring 21 are all moved toward the left as a unit. As is known in the art, the servo motor 32 may include an internal sensor 34 (schematically shown in FIG. 4) which generates an electrical signal when the rotation of the output shaft 32a is prevented, even though the servo motor 32 is energized, as will be explained below.

An electronic position sensor 35 is secured to the stationary left end plate 12, while a target 36 is secured to the movable support plate 22. The position sensor 35 is conventional in the art and is adapted to generate an electrical signal which is representative of the distance from the sensor 35 to the target 36. As mentioned above, the left ring 20 is secured to the stationary left end plate 12, while the right ring 21 is secured to the support plate 22 for movement therewith. Thus, it can be seen that the electrical signal generated by the sensor 35 is also representative of the distance from the left ring 20 to the right ring 21. The purpose of this signal will be explained below.

Referring to the left portion of the apparatus 10, a generally hollow cylindrical mounting bracket 40 is secured to the left end plate 12. A torque motor 41 having a rotatable output shaft 41a is connected to the mounting bracket 40. The right end of the output shaft 41a extends through the bracket 40 into engagement with a spindle 42 which is rotatably supported in the left end plate 12 by a bearing 43. A key or similar means is provided for connecting the output shaft 41a of the torque motor 41 to the spindle 42 for rotation therewith. The spindle 42 is further connected to an externally splined hub 45 for rotation therewith. The hub 45 is located within the rigid test enclosure generally within the opening defined by the left ring 20.

The torque motor 41 is conventional in the art and is adapted to exert a predetermined amount of torque on the output shaft 41a when energized. The left end of the output shaft 41a is connected through a coupling 46 to an optical encoder 47. The encoder 47 is supported on an encoder bracket assembly 48 secured to the base 11. The encoder 47 is conventional in the art and generates an electrical signal which is representative of the direction and magnitude of rotation of the output shaft 41a.

Figure 2:
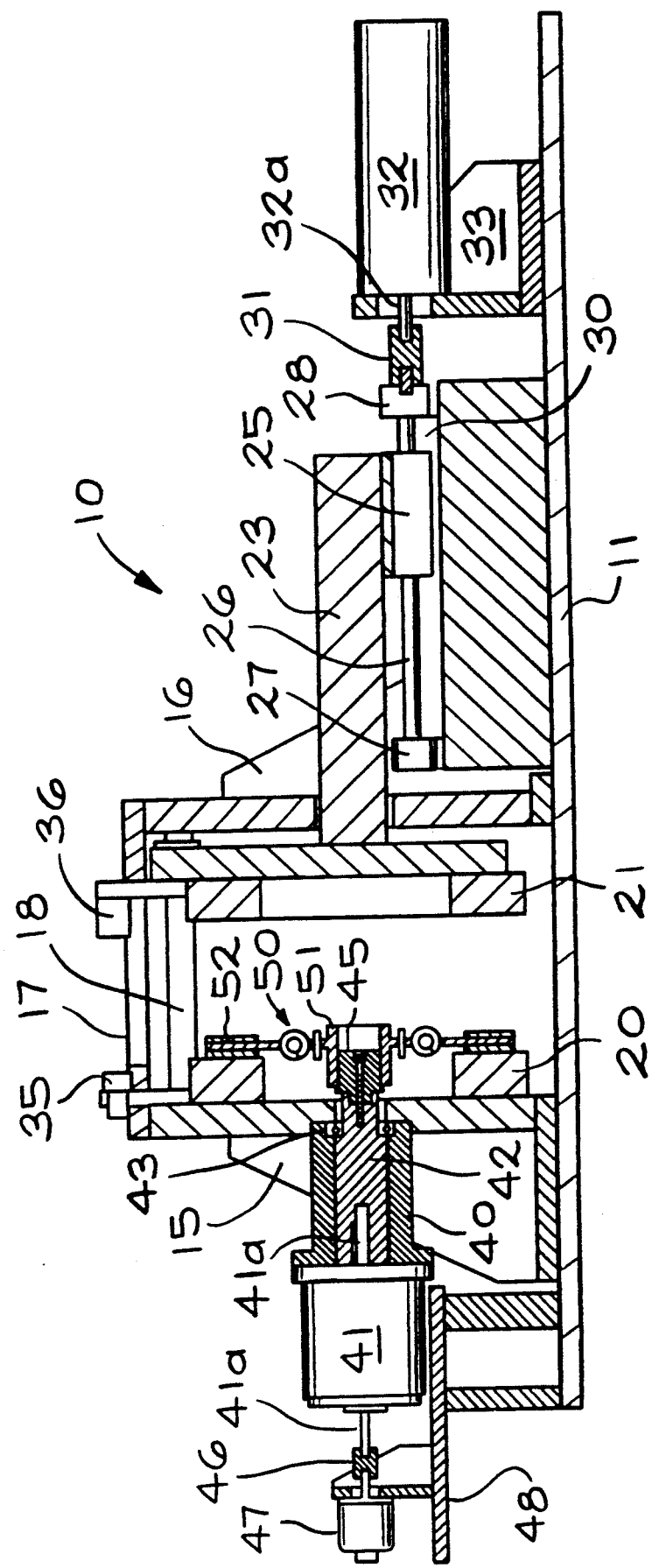
FIG. 2 is a side elevational view similar to FIG. 1 showing a driven disc assembly installed in the spin checking apparatus.
Figure 3:
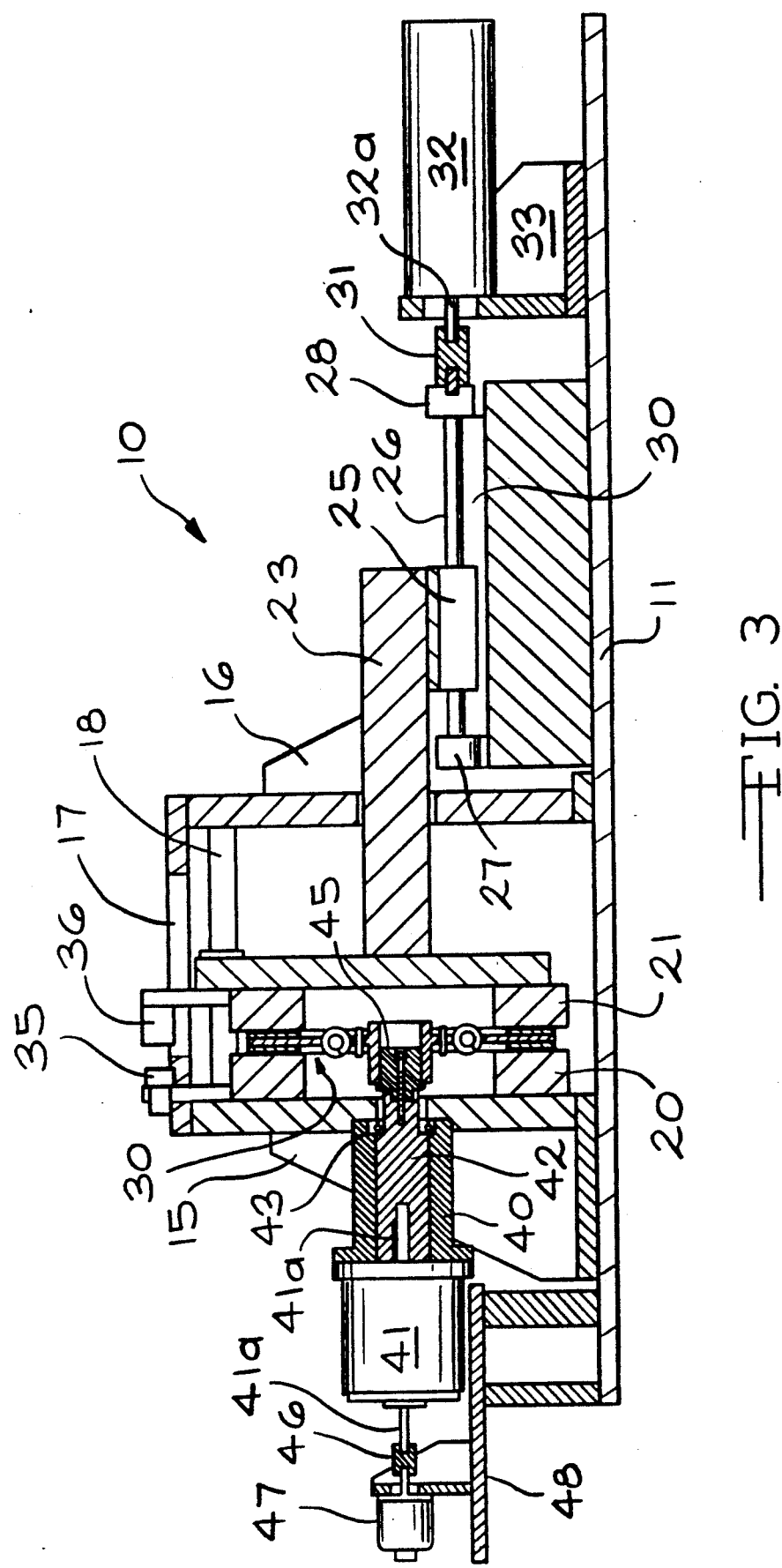
FIG. 3 is a side elevational view similar to FIG. 2 showing the spin checking apparatus in a closed position.

The apparatus 10 is illustrated in FIG. 1 in an opened position, wherein the right ring 21, the support plate 22, and the transfer bar 23 are moved to the right, away from the left ring 20. In this position, a driven disc assembly, indicated generally at 50, may be installed on the hub 45, as shown in FIG. 2. The driven disc assembly 50 includes a central member 51 having an opening formed therein which is internally splined. The internal splines of the central member 51 cooperate with the externally splined hub 45 to prevent relative rotation therebetween. The driven disc assembly 50 further includes an outer member 52 supported on the central member 51. The outer portions of the outer member 52 extend between the aligned portions of the left and right rings 20 and 21. Thus, when the right ring 21, the support plate 22, and the transfer bar 23 are subsequently moved to the closed position (toward the left) as shown in FIG. 3, the outer portions of the outer member 52 are frictionally engaged between the left and right rings 20 and 21.

Figure 4:
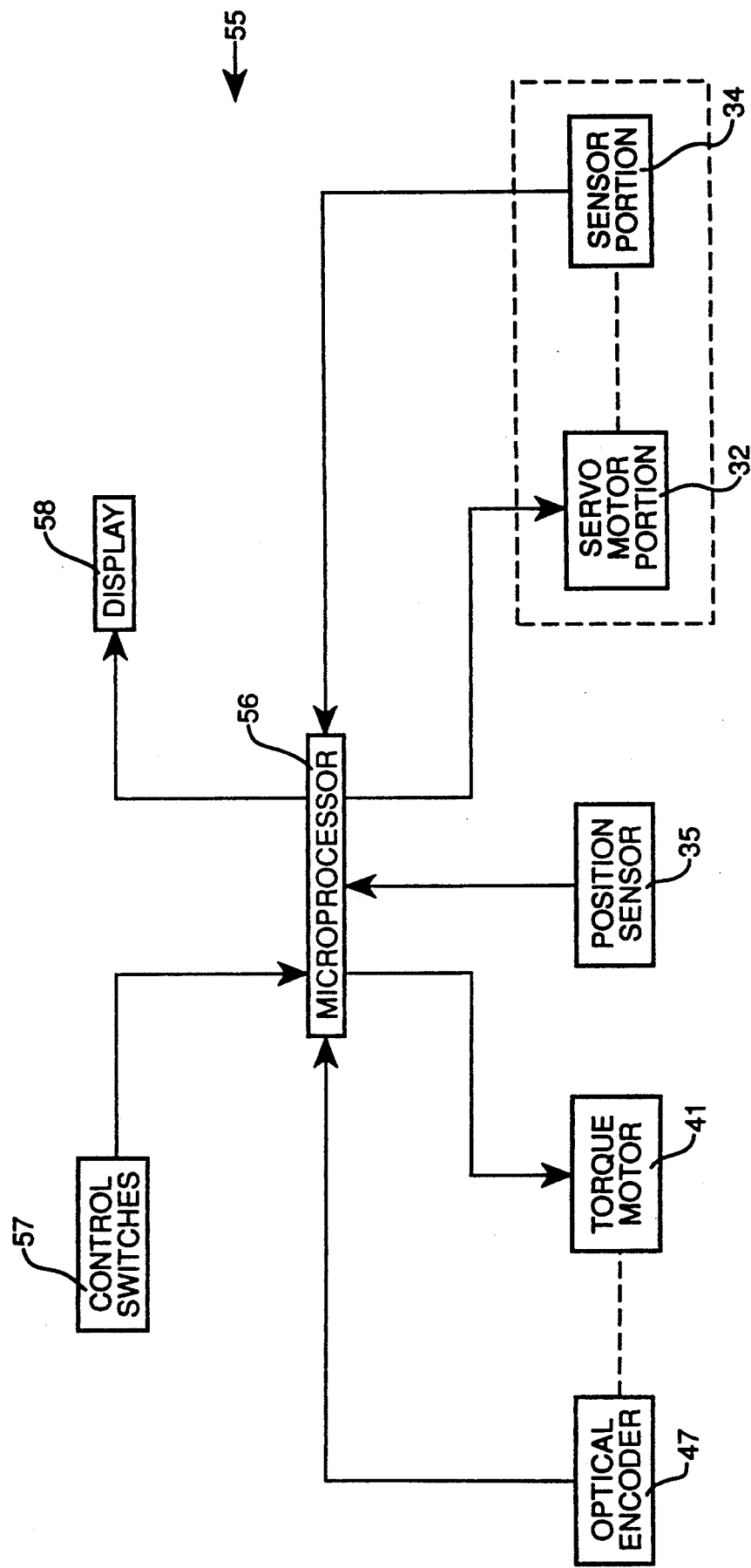
FIG. 4 is a block diagram of the control system for the spin checking apparatus illustrated in FIGS. 1 through 3.

Referring now to FIG. 4, there is illustrated a block diagram of a control system, indicated generally at 55, for the spin checking apparatus 10 thus far described. The control system 55 includes a microprocessor 56 or similar electronic controller having inputs which are connected to the optical encoder 47, the position sensor 35, and the sensor portion of the servo motor 32. A plurality of manually operable control switches 57 are also connected to the inputs of the microprocessor 56. The control switches 57 permit an operator of the apparatus to control the operation thereof. In response to these signals, the microprocessor 56 controls the operation of the torque motor 41 and the servo motor 32. The microprocessor 56 also generates signals to a conventional display 58 to provide the operator of the apparatus 10 with a visual indication of the status thereof.

Figure 5:
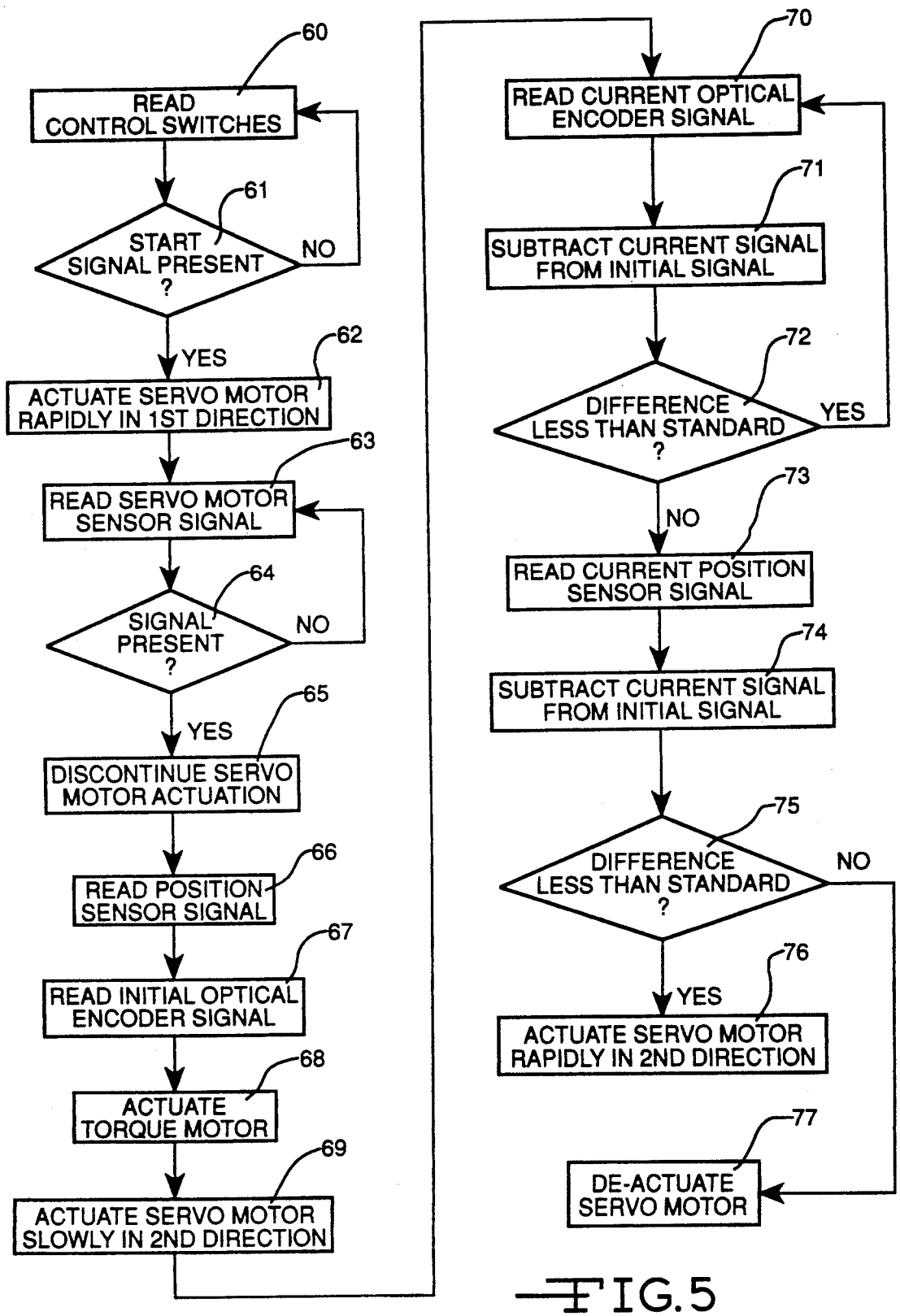
FIG. 5 is a flow chart showing the sequence of operations performed by the microprocessor illustrated in FIG. 4.

Referring now to FIG. 5, there is illustrated a flow chart showing the basic program executed by the microprocessor 56 during operation of the spin checking apparatus 10. After the driven disc assembly 50 to be tested is installed on the hub 45 as shown in FIG. 2, the operator actuates one of the control switches 57 to generate a start signal to the microprocessor 56. The program initially enters an instruction 60, wherein the microprocessor 56 reads the signals (if any) generated by the control switches 57. The program next enters a decision point 61, wherein it is determined whether a start signal has been generated by the operator of the apparatus 10. If the start signal has not been generated, the program branches back to the instruction 60. The microprocessor 56 may be programmed to respond to other signals generated by the control switches 57. Thus, the microprocessor 56 repeatedly reads the values of the control switches 57 until the start signal has been generated.

When the start signal is generated, the program branches from the decision point 61 to an instruction 62, wherein the microprocessor 56 actuates the servo motor 32 to rotate the ball screw shaft 26 at a relatively fast speed in a first rotational direction. As a result, the transfer bar 23, the support plate 22, and the right ring 21 are rapidly moved toward the left. Such rapid movement continues until the outer member 52 of the driven disc assembly 50 is frictionally engaged between the left and right rings 20 and 21. At that point, the servo motor 32 is de-actuated.

To accomplish this, the program next enters an instruction 63, wherein the value of the signal from the sensor portion 34 of the servo motor 32 is read. As previously mentioned, the sensor portion 34 of the servo motor 32 generates a signal when rotation of the output shaft 32a is prevented. This would occur when the right ring 21 frictionally engages the driven disc assembly 50. The program next enters a decision point 64, wherein it is determined if the sensor portion 34 of the servo motor 32 is generating the signal indicating that the right ring 21 has frictionally engaged the driven disc assembly 50. If not, the program branches back to the instruction 63 to re-read the value of the signal from the sensor portion 34 of the servo motor 32. Thus, the program will continuously read the value of this signal until it is generated, indicating that the right ring 21 has frictionally engaged the driven disc assembly 50.

When such frictional engagement occurs, the program will branch from the decision point 64 to an instruction 65, wherein the microprocessor 56 discontinues the actuation of the servo motor 32. The program next enters an instruction 66, wherein the microprocessor 56 reads the value of the signal generated by the position sensor 35. As mentioned above, the value of this signal is representative of the distance between the left and right rings 20 and 21. The program next enters an instruction 67, wherein the microprocessor 56 reads the initial value of the signal generated by the optical encoder 47. This signal represents the starting position of the output shaft 41a of the torque motor 41.

Having made the initial measurements of the distance separating the rings 20 and 21 and the starting position of the torque motor output shaft 41a, the program next enters an instruction 68, wherein the microprocessor 56 actuates the torque motor 41. As mentioned above, the torque motor 41 exerts a predetermined amount of torque (preferably about four inch-pounds) on the output shaft 41a when energized, thus tending to rotate the hub 45 and the driven disc assembly 50 mounted thereon. However, since the driven disc assembly 50 is frictionally engaged between the left and right rings 20 and 21, such rotation is initially prevented.

Next, the program nexts enters an instruction 69, wherein the microprocessor 56 actuates the servo motor 32 to rotate the ball screw shaft 26 at a relatively slow speed in a second rotational direction. As a result, the transfer bar 23, the support plate 22, and the right ring 21 are moved gradually toward the right. It has been found satisfactory to rotate the ball screw shaft 26 at such a rotational speed that the right ring 21 is moved away from the left ring 20 at a speed of about 0.002 inch/second.

As the right ring 21 is moved toward the right (away from the stationary left ring 20), the frictional engagement of the driven disc assembly 50 is gradually reduced. At some point, the torque exerted on the driven disc assembly 50 by the torque motor 41 will exceed the frictional force generated by the engagement of the rings 20 and 21. When this occurs, the driven disc assembly 50 will begin to rotate relative to the rings 20 and 21. When a predetermined amount of rotation has occurred (typically about ten degrees), it is assumed that the driven disc assembly 50 is completely free from the frictional engagement of the rings 20 and 21.

To accomplish this, the program enters an instruction 70, wherein the microprocessor 56 reads the current value of the signal generated by the optical encoder 47. As discussed above, this value is representative of the rotational position of the output shaft 41a and, therefore, the rotational position of the driven disc assembly 50 splined thereon. The program then enters an instruction 71, wherein the current value of the optical encoder signal is subtracted from the initial value of such signal to generate a difference signal. This difference signal represents the amount that the driven disc assembly 50 has rotated from its initial position.

The program enters a decision point 72, wherein this difference signal is compared to the ten degree standard value. If the difference signal is less than this standard value, the program branches back to the instruction 70, wherein the next current value of the optical encoder signal is read. Thus, the program will continuously read the optical encoder signal and compare it with the ten degree standard until the driven disc assembly 50 has rotated at least ten degrees from its original position. At that time, the program branches from the decision point 72 to an instruction 73, wherein the current value of the position sensor signal is read. The program next enter an instruction 74, wherein the current value of the position sensor signal is subtracted from the initial position sensor signal. This difference signal represents the amount of distance which the right ring 21 was required to be moved before the frictional engagement of the driven disc assembly 50 was released. Consequently, the difference signal is also representative of the amount of warpage in the driven disc assembly 50. The program next enters a decision point 75, wherein the value of the position sensor difference signal is compared with a standard value, which represents the maximum allowable warpage in the driven disc assembly. If the difference signal is less than this standard value, the warpage (if any) of the driven disc assembly 50 is within specified tolerances. Accordingly, the program branches to an instruction 76, wherein the microprocessor 56 actuates the servo motor 32 to rotate the ball screw shaft 26 at a relatively fast speed in the second rotational direction. This rapidly moves the right ring 21 toward the right, allowing the operator to remove the driven disc assembly 50 and install another such assembly for testing.

If the difference signal is greater than the standard value, the warpage of the driven disc assembly 50 is beyond specified tolerances. Accordingly, the program branches to an instruction 77, wherein the microprocessor 56 de-actuates the servo motor 32 to halt further movement of the right ring 21. As a result, the operator must manually acknowledge (by means of one of the control switches 57) that the driven disc assembly is defective. When such acknowledgement is made, the microprocessor 56 actuates the servo motor 32 to rotate the ball screw shaft 26 at a relatively fast speed in the second rotational direction to permit removal of the defective assembly 50. At the same time, the microprocessor 56 can actuate the display 58 to generate a visible alert to the operator that the assembly 50 is defective.

Thus, it can be seen that the apparatus 10 automatically determines whether the assembly 50 is within specified tolerances. Furthermore, the apparatus 10 generates external indications to the operator of the condition of the tested assembly 50, thereby minimizing the chances of operator error. Since specific measurements are taken for each assembly 50 being tested, such measurements can be easily stored in the microprocessor 56 and used for statistical process control.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. An apparatus for automatically spin checking a driven disc assembly for a clutch comprising:
    an enclosure having a stationary ring mounted thereon and a movable ring slidably supported thereon;
    means for supporting the drive disc assembly between said rings;
    means for moving said movable ring toward said stationary ring so as to frictionally engage the driven disc assembly therebetween;
    means responsive to the frictional engagement of the driven disc assembly for measuring a first distance separating said rings;
    means for exerting a force to attempt to rotate the driven disc assembly the frictional force generated by said rings;
    means for moving said movable ring away from said stationary ring after said first distance has been measured so as to reduce the frictional force exerted on the driven disc assembly;
    means responsive to a predetermined amount of rotation of the driven disc assembly as the frictional force exerted thereon is reduced for measuring a second distance separating said rings when such rotation begins; and
    means responsive to the difference between said first and second distances for determining if the driven disc assembly is excessively warped.

2. The apparatus defined in claim 1 wherein said means for moving said movable ring toward and away from said stationary ring includes a motor having an output shaft which is rotatable in two directions, and means for connecting said output shaft to said movable ring.

3. The apparatus defined in claim 2 wherein said means responsive to the frictional engagement of the driven disc assembly includes means responsive to the operation of said motor for sensing when said frictional engagement has occurred.

4. The apparatus defined in claim 2 wherein said means for connecting said output shaft to said movable ring includes a ball screw shaft connected to said output shaft for rotation therewith and a nut connected between said ball screw shaft and said ring for translating rotational movement of said output shaft to linear movement of said movable ring.

5. The apparatus defined in claim 4 wherein said motor is a bi-directional servo motor.

6. The apparatus defined in claim 1 wherein said means for supporting the driven disc assembly includes a splined hub connected to a support shaft.

7. The apparatus defined in claim 6 wherein said means for exerting a force to attempt to rotate the driven disc assembly includes a torque motor having an output shaft connected to said support shaft.

8. The apparatus defined in claim 7 wherein said means responsive to a predetermined amount of rotation of the driven disc assembly includes encoder means connected to said torque motor output shaft.

9. The apparatus defined in claim 8 wherein said encoder means is an optical encoder.

10. The apparatus defined in claim 1 wherein said means for measuring a first distance separating said rings includes a fixed position sensor connected to said stationary ring and a target secured to said movable ring, said position sensor generating a signal which is equal to the distance separating it from said target and, therefore, which is representative of the distance separating said rings.

11. The apparatus defined in claim 1 further including microprocessor means for controlling the operation of said means for moving said movable ring toward said stationary ring, said means responsive to the frictional engagement of the driven disc assembly for measuring a first distance separating said rings, said means for exerting a force to attempt to rotate the drive disc assembly against the frictional force generating by said rings, said means for moving said movable ring away from said stationary ring after said first distance has been measured so as to reduce the frictional force exerted on the driven disc assembly, and said means responsive to a predetermined amount of rotation of the driven disc assembly as the frictional force exerted thereon is reduced for measuring a second distance separating said rings when such rotation begins.

12. The apparatus defined in claim 11 wherein said microprocessor means is responsive to the difference between said first and second distances for determining if the driven disc assembly is excessively warped.

13. The apparatus defined in claim 12 further including display means connected to said microprocessor means for indicating whether the driven disc assembly is excessively warped.

14. The apparatus defined in claim 1 wherein said means for determining if the driven disc assembly is excessively warped rapidly moves said movable ring away from said stationary ring when it is determined that the driven disc assembly is not excessively warped.

15. The apparatus defined in claim 1 wherein said means for determining if the driven disc assembly is excessively warped stops the movement of said movable ring away from said stationary ring to prevent removal thereof when it is determined that the driven disc assembly is excessively warped.

16. The apparatus defined in claim 15 further including means for manually causing said movable ring to move away from said stationary ring after such movement of said movable ring has been stopped to permit removal thereof.

* * * * *

UNITED STATES PATENT AND TRADEMARK OFFICE
CERTIFICATE OF CORRECTION

PATENT NO. : 5,207,092

DATED : May 4, 1993

INVENTOR(S) : Frank L. Bruno

It is certified that error appears in the above-identified patent and that said Letters Patent is hereby corrected as shown below:

```
COLUMN 7:
Claim  1, line  6,   after "the", change "drive" to
                    -- driven --.
COLUMN 7:
Claim  1, line 15,   after "assembly", insert -- against --.
COLUMN 8:
Claim 11, line  7,   after "the", change "drive" to
                    -- driven --.
```

Signed and Sealed this

Eleventh Day of January, 1994

Attest:

BRUCE LEHMAN

*Attesting Officer*     *Commissioner of Patents and Trademarks*